United States Patent [19]
Koenig et al.

[11] Patent Number: 5,245,893
[45] Date of Patent: Sep. 21, 1993

[54] TRANSMISSION DETENT SHIFT CONTROL WITH ACCELERATION-BASED COMPENSATION

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 956,134

[22] Filed: Oct. 2, 1992

[51] Int. Cl.$^5$ ............................................. B60K 41/04
[52] U.S. Cl. ......................................... 74/861; 74/856; 74/860; 74/865; 74/866; 364/424.1
[58] Field of Search ................. 74/856, 861, 865, 866, 74/860; 364/424.1

[56] References Cited
U.S. PATENT DOCUMENTS

| | | | |
|---|---|---|---|
| 4,263,826 | 4/1981 | Hartz et al. | 74/868 |
| 4,361,060 | 11/1982 | Smyth | 364/424.1 X |
| 4,671,139 | 6/1987 | Downs et al. | 74/866 |
| 4,785,917 | 11/1988 | Tateno et al. | 74/872 X |
| 4,905,544 | 3/1990 | Ganoung | 364/424.1 X |
| 5,086,666 | 2/1992 | Moriki | 364/424.1 X |
| 5,161,174 | 11/1992 | Pigozzi | 364/424.1 X |
| 5,178,044 | 1/1993 | Suzuki et al. | 364/424.1 X |

Primary Examiner—Leslie A. Braun
Assistant Examiner—David E. Henn
Attorney, Agent, or Firm—Mark A. Navarre

[57] ABSTRACT

An improved detent shift control in which upshift initiation is adjusted in relation to the engine acceleration and the expected shift delay time so that the engine speed limit is not exceeded. Data recorded in the course of the shift is analyzed upon completion of the shift, and the control adaptively adjusts the expected delay time if a significant timing error is detected. Whenever the engine throttle position exceeds a detent threshold, a shift trigger speed for the next higher gear is determined by subtracting a delay-based speed from the desired engine shift speed. The delay-based speed is determined according to the product of the engine acceleration and the stored delay time. The shift is initiated when the engine speed reaches the trigger speed so that the engine speed is prevented from exceeding the desired shift speed. If data collected during the shift reveals that the actual shift speed significantly deviated from the desired shift speed, the controller develops and stores a temperature-based adaptive delay time correction for that shift type. In subsequent detent upshifting to the same gear, the delay time correction is combined with the stored empirical delay time in the determination of the shift trigger speed.

9 Claims, 8 Drawing Sheets

| GEAR | RATIO | C1 | C2 | C3 | C4 | C5 | OC | RC |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | OFF | OFF |
| R | -2.06 | OFF | OFF | ON | OFF | OFF | ON | ON |

FIG. 1c

| SOLENOID STATES | | | |
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 1d

TRANSMISSION DETENT SHIFT CONTROL WITH ACCELERATION-BASED COMPENSATION

This invention relates to detent shift control of an automatic transmission, and more particularly, to a control which is compensated for acceleration so that engine speed limits are not exceeded.

BACKGROUND OF THE INVENTION

Transmission shifting, in an automotive powertrain, is generally scheduled in relation to predefined relationships between vehicle speed and an engine load indicator, such as throttle position or manifold pressure. Representative engine throttle (TPS) vs. vehicle speed (Nv) relationships for first gear-to-second gear and second gear-to-third gear upshifts of an automotive transmission are graphically depicted in FIG. 2 by the traces 1-2 and 2-3, respectively. A 1-2 upshift is initiated, for example, when the TPS vs. Nv operating point of the vehicle crosses the 1-2 upshift line.

At throttle openings above a detent threshold (KDETENT), such as 90%, upshifting is scheduled at predefined vehicle speed thresholds (designated Nv(1-2) and Nv(2-3) in FIG. 2) regardless of the exact throttle position. These speed thresholds are generally designed to prevent the engine speed from exceeding a limit value, and such shifts are referred to as detent upshifts. In certain instances, more accurate detent upshift control may be achieved by substituting engine speed thresholds for the vehicle speed thresholds.

In either case, the underlying difficulty is that a variable amount of shift delay time typically elapses between the initiation of a shift command and the point at which the upshift actually occurs. The engine speed continues to rise in the course of the delay, and the engine speed limit may be exceeded before the shift actually occurs. This occurs primarily in high performance vehicles, and engine governor controls are generally employed to prevent engine damage.

SUMMARY OF THE PRESENT INVENTION

The present invention is directed to an improved detent shift control in which upshift initiation is adjusted in relation to the engine acceleration and the expected shift delay time so that desired engine speed limits are not exceeded. Data recorded in the course of the shift is analyzed upon completion of the shift, and the control adaptively adjusts the expected delay time if a significant delay time error is observed.

In the illustrated embodiment, empirically determined delay times for the various detent upshifts (1-2, 2-3, etc.) are stored in memory as a function of transmission temperature. Whenever the engine throttle position exceeds the detent threshold, a shift trigger speed for the next higher gear is determined by subtracting a delay-based speed from the desired engine shift speed. The delay-based speed represents the engine speed change which is expected to occur in the course of the stored delay time DTME, and is determined according to the product of the engine acceleration ACCEL and DTME.

The shift is initiated when the engine speed reaches the trigger speed, ensuring that the peak engine speed occurring during the shift substantially coincides with the desired (limit) shift speed. If data collected during the shift reveals that the peak engine speed significantly deviated from the desired shift speed, the controller develops and stores a temperature-based adaptive delay time correction DADPT for that shift type. In subsequent detent upshifting to the same gear, the delay time correction DADPT is combined with the stored empirical delay time DTME in the determination of the shift trigger speed.

The control of this invention thus ensures that the peak engine shift speed substantially coincides with the desired shift speed, avoiding the reliance on engine speed governor controls to prevent engine over-speeding during shifting. The adaptive adjustment of the empirically determined delay times ensures consistent performance of the control regardless of vehicle-to-vehicle variability or progressively occurring performance variations of the powertrain.

BRIEF DESCRIPTION OF THE DRAWINGS

FIG. 1c is a state diagram for the clutches of the transmission depicted in FIGS. 1a-1b.

FIG. 1d is a chart depicting the electrical state changes required for shifting from one speed ratio to another.

DETAILED DESCRIPTION OF THE INVENTION

Figure 1A:
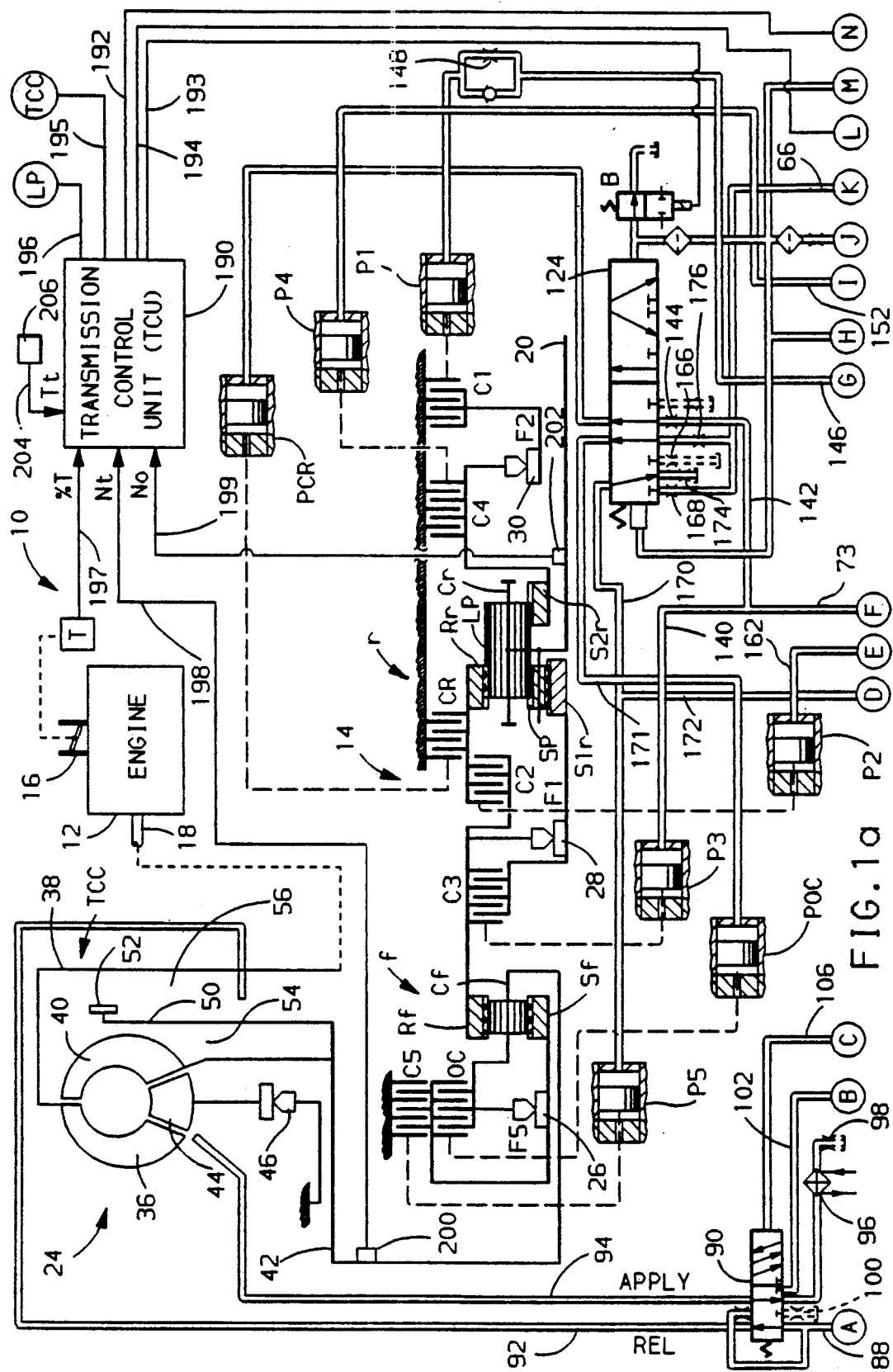
FIGS. 1a-1b form a schematic diagram of a five-speed automatic transmission controlled in accordance with this invention by a computer-based control unit.
Figure 1B:
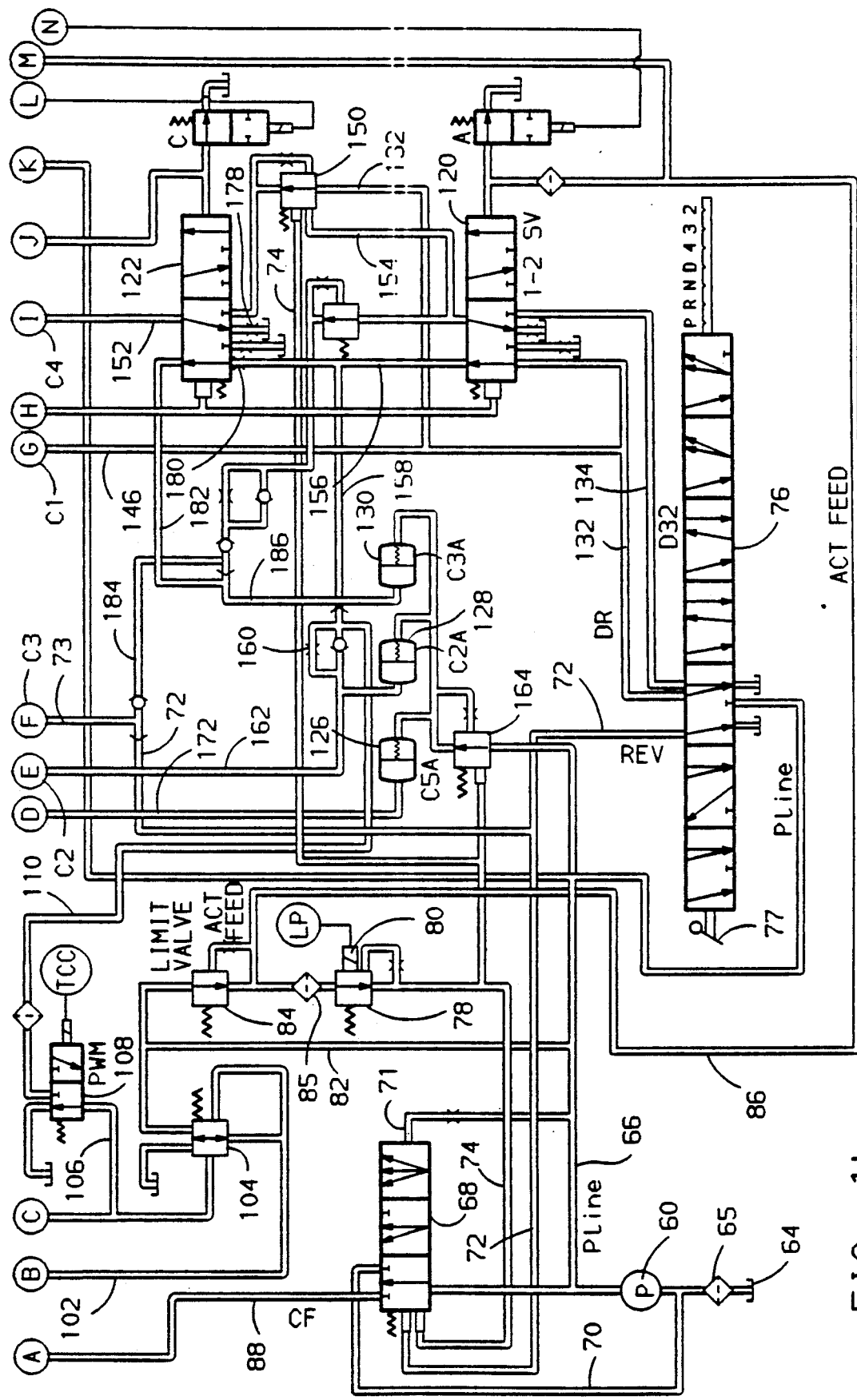

Referring now to FIGS. 1a-1b of the drawings, the control of the present invention is described in reference to a motor vehicle drivetrain 10 including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18.

The transmission 14, in turn, transmits engine output torque to an output shaft 20 through a torque converter 24 and one or more of the fluid operated clutches C1-C5, OC, Reverse clutch RC, and one-way clutches 26-30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The long pinion LP mechanically couples sun gears S1r and S2r through short pinion SP, and the carrier Cr is connected as an output to shaft 20.

The various speed ratios and the clutch states required to establish them are set forth in the chart of FIG. 1c. Referring to that Figure, it is seen that the Park/Neutral condition is established by releasing all of the clutches. A garage shift to Reverse is effected by engaging the C3, OC and RC clutches. In the forward speed ranges, a garage shift to 1st is effected by engaging the clutches C1, C4 and OC. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd to 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

The timing of the 3-4 upshift and 4-3 downshift state changes must be properly coordinated to avoid conditions which would cause the ratio to change in the wrong direction or at the wrong rate. In the upshift, for example, care must be taken to ensure that on-coming clutch C3 is ready to lock-up the rearward gearset r when off-going clutch C5 is released to lock-up the forward gearset f. Otherwise, the Ni/No ratio initially increases from the 3rd ratio of 1.37 toward the 2nd ratio of 1.85. Conversely, in the 4-3 downshift, care must be taken to ensure that on-coming clutch C5 is ready to engage to establish an overdrive condition in the forward gearset f when off-going clutch C3 is released. Otherwise, the Ni/No ratio increases toward the 2nd ratio of 1.85 instead of the 3rd ratio of 1.37.

Completing the shift analysis, the upshift from 4th to 5th is effected by engaging clutch C5 and releasing clutch OC to operate the forward gearset f in an underdrive condition, thereby providing a Ni/No ratio of 0.74. Downshifting from 4th to 3rd is effected by releasing clutch C5 and engaging clutch OC.

A positive displacement hydraulic pump 60 is mechanically driven by the engine output shaft 18. Pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which in turn directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98. When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110. When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1-C5, OC and CR are activated by conventional fluid operated pistons P1-P5, POC and PCR, respectively. The pistons in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120-124 for application to the fluid operated pistons P1-P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

A chart of the ON/OFF states of valves A, C and B for establishing the various transmission speed ratios is given in FIG. 1d. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 1d, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2-1 downshift is effected by energizing the Solenoid Operated Valve A.

Referring again to the chart of FIG. 1d, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3-2 downshift is effected by deenergizing the Solenoid Operated Valve B.

Referring again to the chart of FIG. 1d, a 3-4 upshift is effected by deenergizing Solenoid Operated Valves B and C to return Shift Valves 124 and 122 to their default positions, as depicted in FIGS. 1a-1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3. Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4-3 downshift is effected by energizing the Solenoid Operated Valves B and C.

Referring again to the chart of FIG. 1d, a 4-5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5-4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192-196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198, an output speed signal No on line 199 and a transmission temperature signal Tt on line 204. The throttle signal is based on the position of engine throttle 16, as sensed by transducer T; the turbine speed signal is based on the speed of turbine shaft 42, as sensed by sensor 200; the output speed signal is based on the speed of output shaft 20, as sensed by sensor 202, and the transmission temperature signal Tt is based on the temperature of the fluid in reservoir 64, as determined by the temperature sensor 206.

Figure 2:
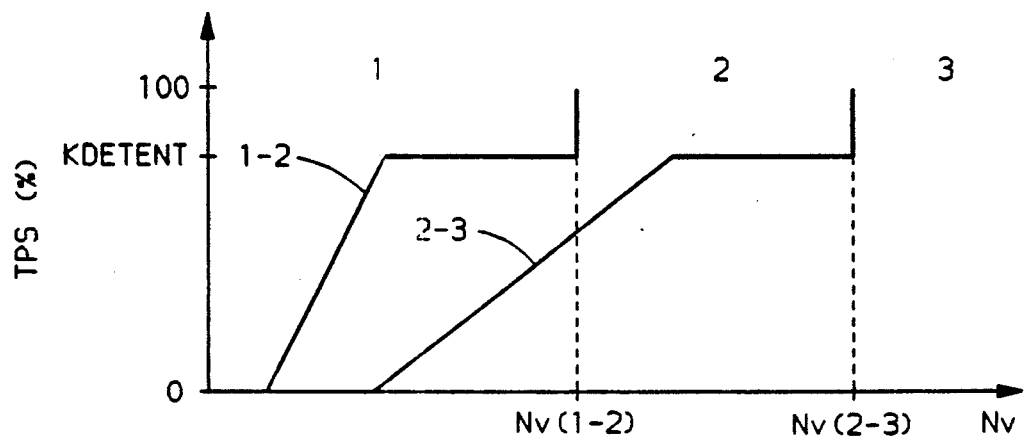
FIG. 2 graphically depicts a conventional shift pattern control for scheduling 1-2 and 2-3 upshifts.

As indicated above, the control of this invention is directed to a control of shift scheduling when the engine throttle signal %T exceeds a detent threshold KDETENT, defined in FIG. 2. This control is described in detail below in reference to the computer flow diagrams of FIGS. 6-8, which represent a series of computer program instructions executed by TCU 190 in the course of vehicle operation. Prior to discussing the flow diagrams, however, the control of this invention is described in reference to the graphs of FIGS. 3a-3b, 4 and 5.

Figure 3A:
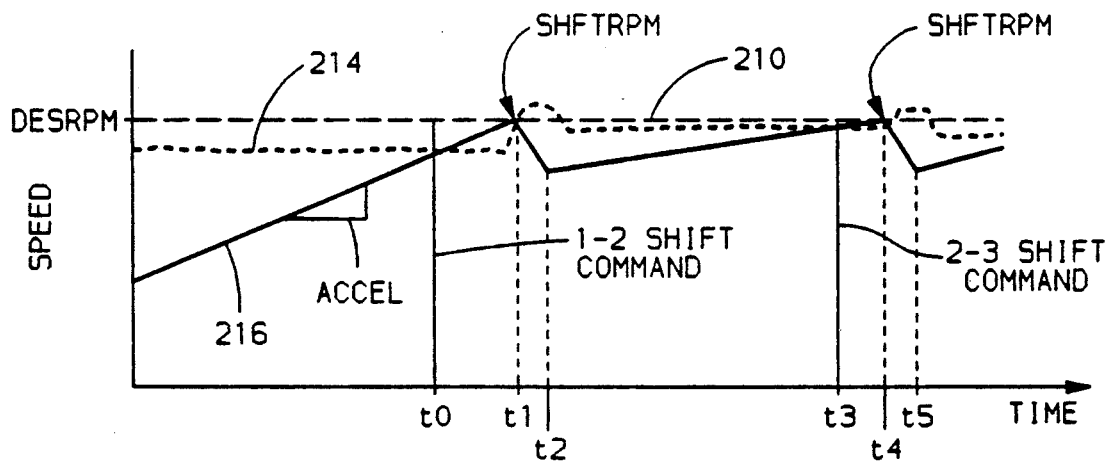
FIGS. 3a-3b graphically depict successive 1-2 and 2-3 detent upshifts carried out in accordance with the control of this invention.
Figure 3B:
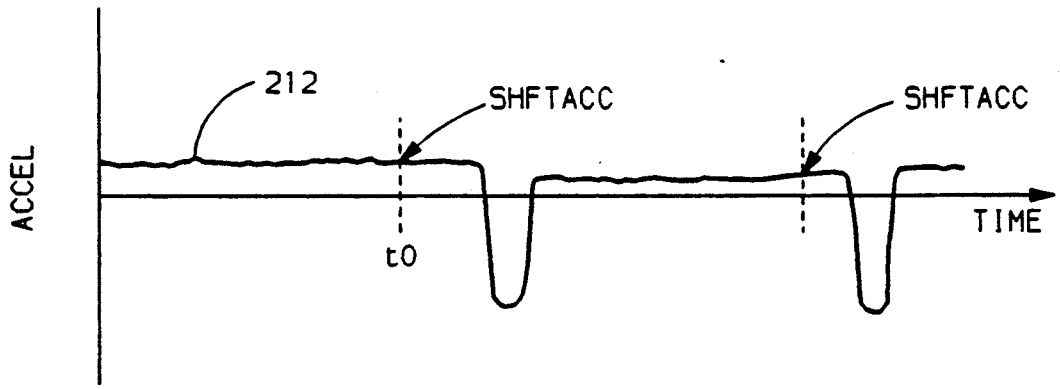
Figure 4:
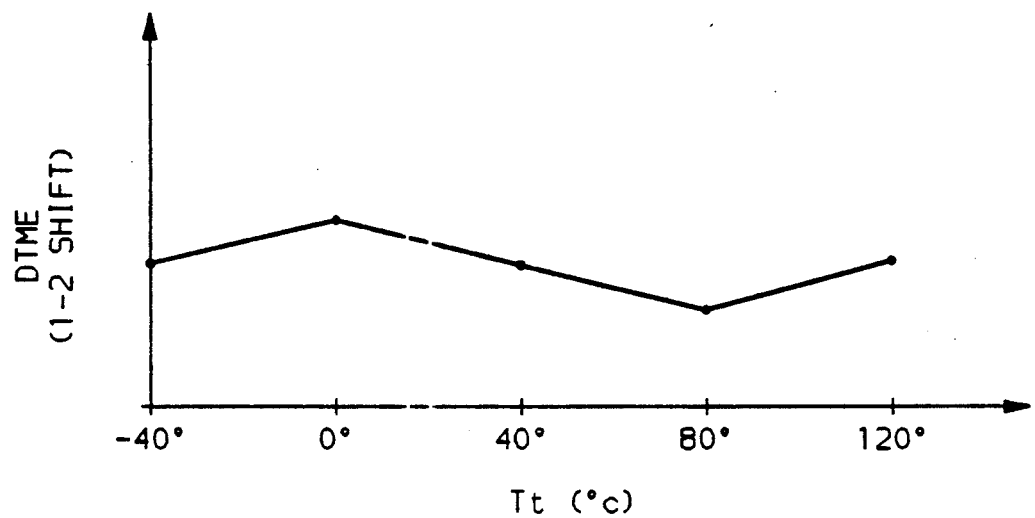
FIG. 4 graphically depicts representative stored shift delay time data as a function of transmission temperature.
Figure 5:
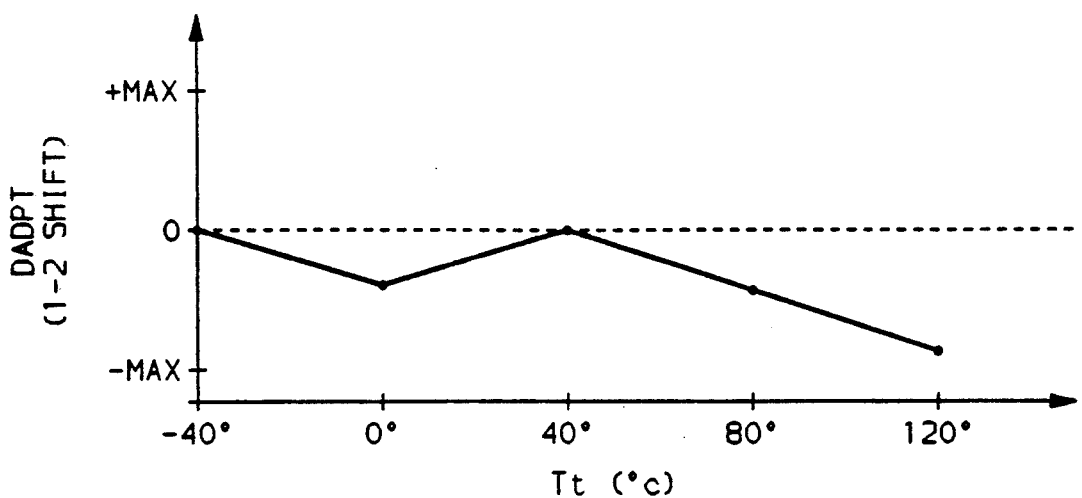
FIG. 5 graphically depicts representative stored adaptive delay time correction data as a function of transmission temperature.

FIGS. 3a-3b depict several shift control parameters on a common time base in the course of successive 1-2 and 2-3 detent upshifts. As indicated above, such shifts are sometimes difficult to properly schedule due to the variable time delay between the initiation of a shift (solenoid state change) and the point at which the engine speed decreases due to the shift. This delay time, although subject to some variability, can be empirically determined and stored in TCU 190 as a function of the transmission fluid temperature Tt. In the illustrated embodiment, the data for each type of shift (that is, 1-2, 2-3, etc.) is stored in a five-point table, as graphically depicted for the 1-2 upshift in FIG. 4.

If the shift is initiated too soon, the shift will be completed before the desired shift speed (DESRPM) is reached, compromising the performance of the powertrain. If the shift is initiated too late, the engine speed will exceed the desired shift speed DESRPM before the shift is complete, invoking the operation of an engine governor control to protect the engine.

According to this invention, the detent shift initiation speed (TRIGGER SPEED) for ensuring that the peak engine speed substantially coincides with the desired shift speed DESRPM is determined according to the expression:

TRIGGER SPEED=DESRPM−(ACCEL * DTME)

where ACCEL is the engine acceleration prior to shift initiation and DTME is the empirically determined and stored shift delay time. The TCU 190 repeatedly computes the TRIGGER SPEED during detent operation (%T>KDETENT), and initiates a detent upshift when the actual engine speed exceeds the TRIGGER SPEED. Prior to the 1-2 shift, the TRIGGER SPEED is determined based on a DTME value obtained from the 1-2 shift delay table. After completion of the 1-2 shift, the TRIGGER SPEED is determined based on a DTME value obtained from the 2-3 shift delay table, and so on.

The above operation is graphically depicted in FIG. 3a-3b, where trace 210 represents the desired shift time DESRPM, trace 212 represents the engine acceleration ACCEL, trace 214 represents the computed TRIGGER SPEED, and trace 216 represents the actual engine speed Ne. The engine speed Ne exceeds the TRIGGER SPEED at time t0, resulting in the generation of a 1-2 shift command as indicated in FIG. 3a.

The inertia (engine speed change) phase of the shift occurs in the interval t1-t2, as reflected in the engine speed and acceleration traces 216 and 212, respectively. When the engine speed Ne subsequently exceeds the TRIGGER SPEED at time t3, a 2-3 shift command is initiated as indicated in FIG. 3a. In this case, the inertia phase of the shift occurs in the interval t4-t5, again as reflected in the engine speed and acceleration traces 216 and 212.

An important aspect of the present invention also lies in the adaptive compensation of the above-described control for variations in the actual shift time in a given vehicle. These variations, which may be due to manufacturing tolerances or powertrain performance variations in general, are judged by determining a shift time delay error DELERR. In the illustrated embodiment, DELERR is determined based on the engine acceleration at the time of the shift (SHFTACC) and the difference between the peak shift speed SHFTRPM and the desired shift speed DESRPM, according to the expression:

DELERR=(SHFTRPM−DESRPM)/SHFTACC

As denoted in FIGS. 3a-3b, the shift acceleration SHFTACC is defined as the engine acceleration when the respective shift was commanded, and the actual shift speed is defined as the peak engine speed during the course of the shift.

If the magnitude of the delay time error DELERR falls outside a window of expected variability defined by a predetermined threshold error, a correction amount based on DELERR is applied to a table of adaptive delay time correction values DADPT. In the illustrated embodiment, the correction values are stored in a five-point look-up table as a function of the transmission temperature, as graphically depicted in FIG. 5, mirroring the base delay time table depicted in FIG. 4. The vertical axis designation MAX represents the maximum value the adaptive correction table may have.

In subsequent detent upshifting of the same type, the determination of the TRIGGER SPEED is based on the sum of the base and adaptive delay time values. That is,

TRIGGER SPEED=DESRPM−[ACCEL * (DTME+DADPT)].

In this way, the TRIGGER SPEED is adaptively adjusted over time to reflect variability in the shift delay time so that the actual shift speed SHFTRPM repeatedly coincides with the desired shift speed DESRPM regardless of such variability.

Figure 6:
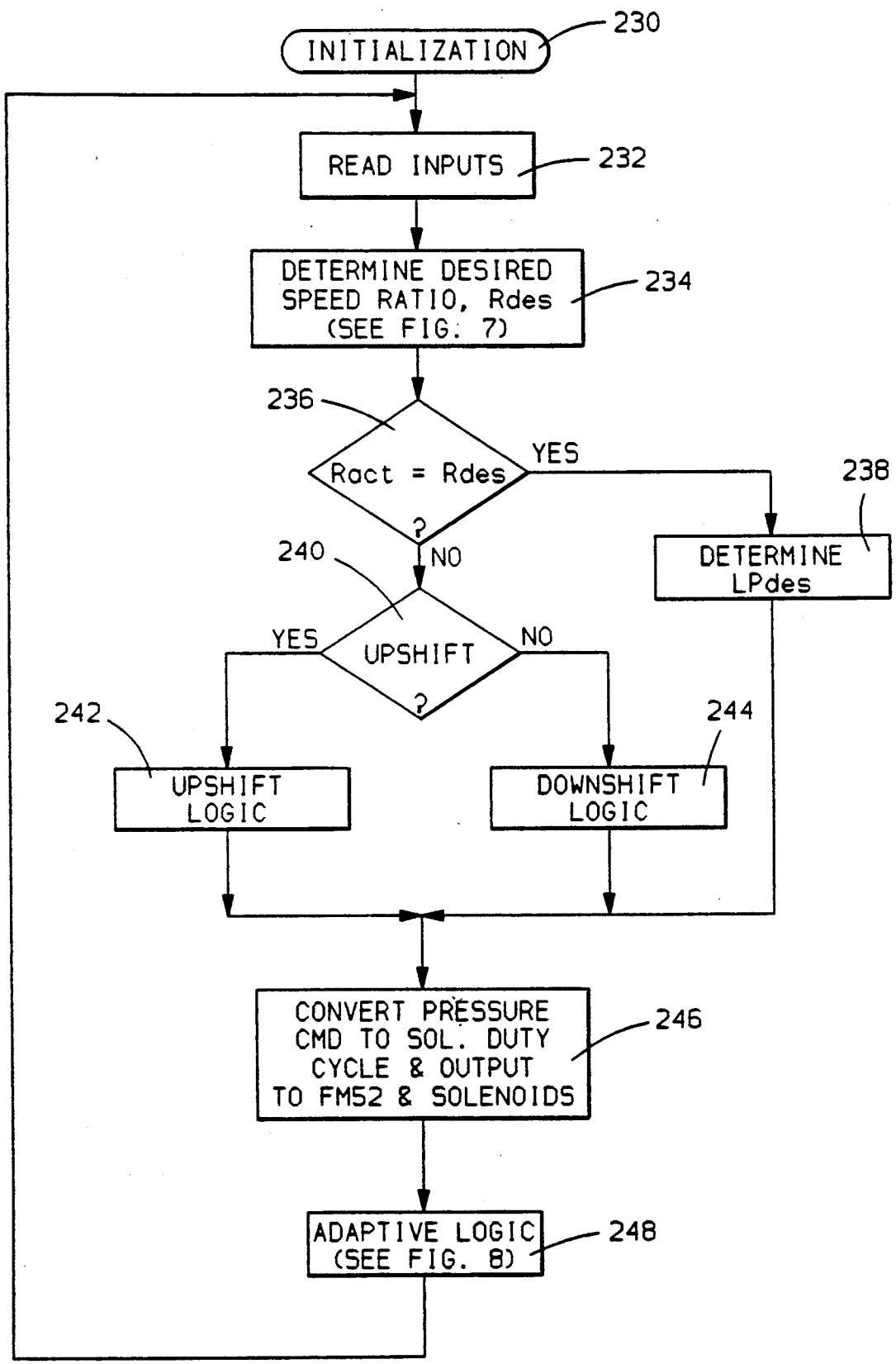
FIGS. 6, 7 and 8 depict flow diagrams representative of computer program instructions executed by the control unit of FIG. 1a in carrying out the shift control of this invention.
Figure 7:
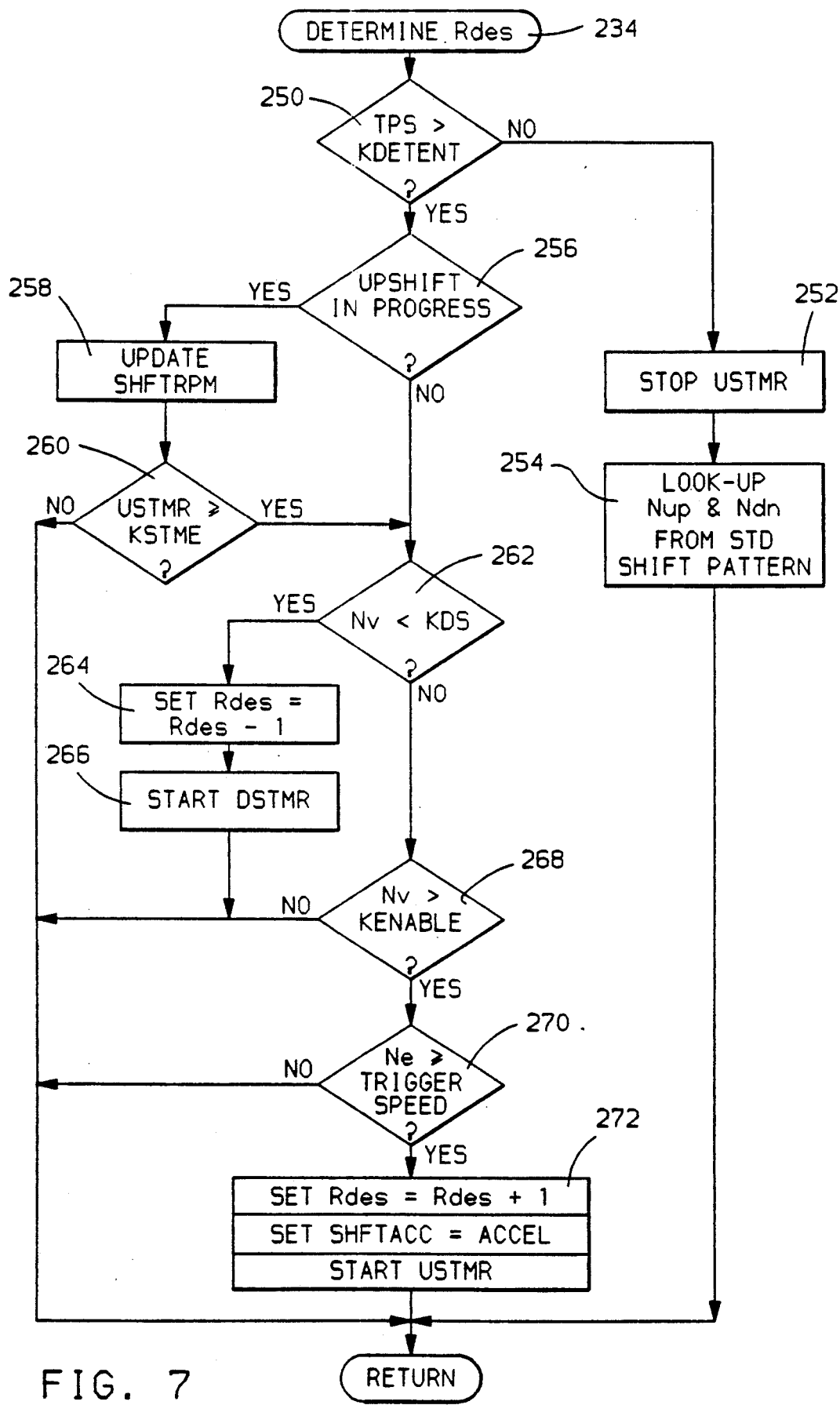
Figure 8:
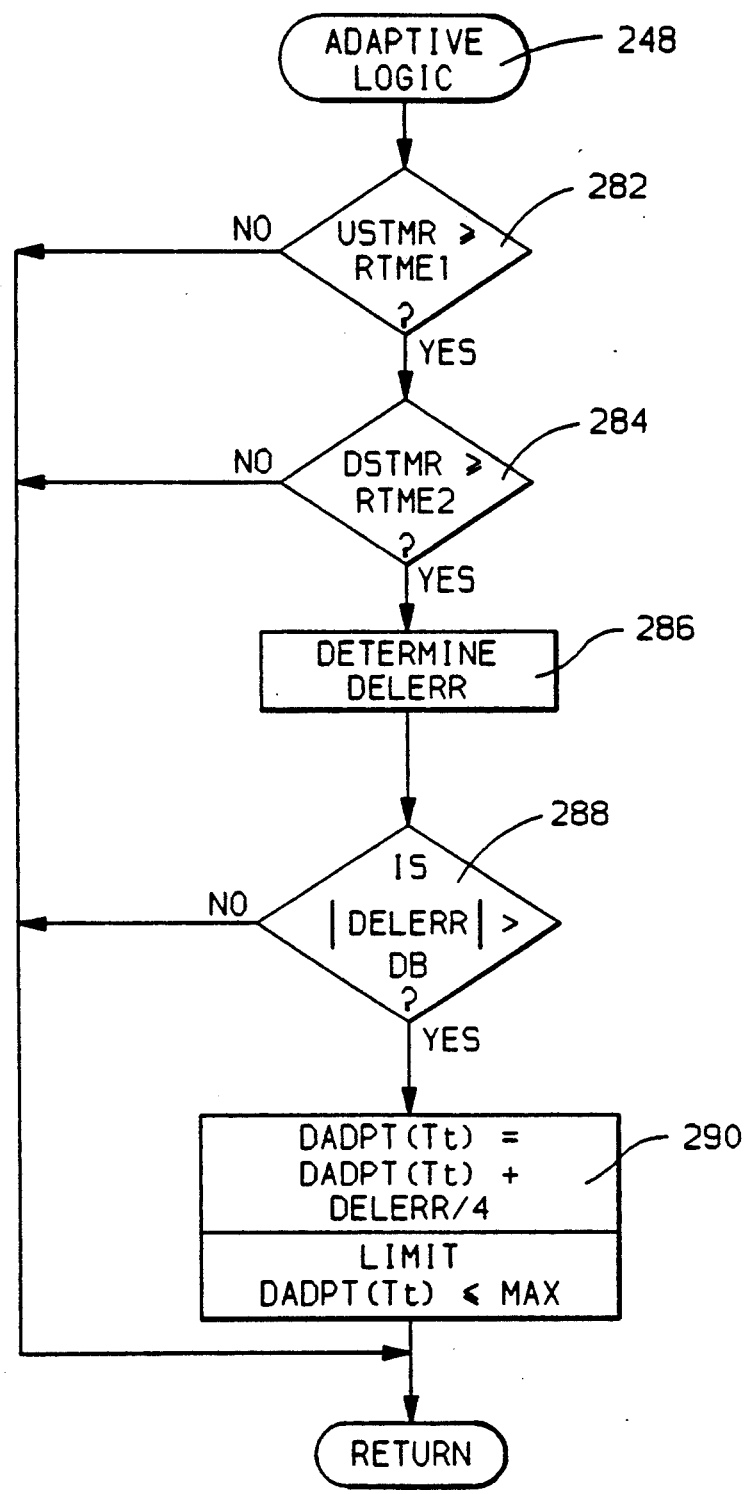

Referring now to FIGS. 6-8, the flow diagram of FIG. 6 represents a main or executive computer program which is periodically executed in the course of vehicle operation in carrying out the control of this invention. The block 230 designates a series of program instructions executed at the initiation of each period of vehicle operation for setting various terms and timer values to an initial condition. Thereafter, the block 232 is executed to read the various inputs referenced in FIG. 1a and to compute certain terms such as the actual speed ratio Ract and the engine acceleration ACCEL.

The block 234 is then executed to determine the desired speed ratio Rdes, as more fully defined in the DETERMINE Rdes flow diagram of FIG. 7. If Ract is equal to Rdes, as determined at block 236, the block 238 is executed to determine the desired line pressure LPdes for steady state operation of the vehicle. If Ract is not equal to Rdes, shifting is indicated, and the blocks 240-244 are executed to determine a desired line pressure LPdes for shifting, as well as the timing of the required solenoid state change. In any case, the block 246 is then executed to convert the desired line pressure LPdes to a solenoid duty cycle LP(DC) and to output the various duty cycles and discrete solenoid states to the solenoid operated valves described above in reference to FIGS. 1a-1b.

Referring now to the DETERMINE Rdes routine of FIG. 7, the decision block 250 is first executed to determine if the throttle position TPS exceeds the detent threshold KDETENT. If not, the blocks 252-254 are executed to stop the upshift timer USTMR (a timer initiated upon issuance of a detent upshift command) and to look-up upshift and downshift speeds Nup, Ndn from a standard shift pattern of the type illustrated in FIG. 2. If TPS is greater than KDETENT and a detent upshift is still in progress, as determined at blocks 250 and 256, the block 258 is executed to update SHFTRPM in accordance with the maximum engine speed observed during the shift. If less than a reference shift time KSTME has elapsed since initiation of the shift, as determined at block 260, the TCU 190 exits the routine. Otherwise, the shift is considered as completed, and the block 262 is executed to determine if the vehicle speed Nv is less than a gear-dependent speed threshold KDS for detent downshifting. If so, the blocks 264-266 are executed to decrement Rdes and to start a downshift timer DSTMR.

If the vehicle speed Nv is greater than an enabling threshold speed KENABLE, as determined at block 268, the block 270 is executed to determine if the engine speed Ne has reached the TRIGGER SPEED. Algebraically, the decision may be expressed as:

$$Ne \geq DESRPM - [ACCEL * (DTME + DADPT)].$$

If the above expression is satisfied, the block 272 is executed to initiate a detent upshift by incrementing Rdes. At the same time, the engine acceleration ACCEL is stored as the shift acceleration SHFTACC, and the upshift timer USTMR is started, completing the routine.

Referring now to the ADAPTIVE LOGIC of FIG. 8, the decision blocks 282-284 are initially executed to determine if the entry conditions for adaptive correction have been met. Block 282 compares the upshift timer USTMR to a reference time RTME1 to determine if the detent mode has been in effect for at least a reference time after the last detent upshift was initiated. Block 284 compares the downshift timer DSTMR to a reference time RTME2 to determine if at least a reference amount of time has elapsed since the initiation of the last detent downshift. Affirmative resolution of both decision blocks indicates the occurrence of an upshift for which the conditions for adaptive correction have been met—namely, the detent throttle position must have been maintained during the upshift (block 282), and the last downshift must have been completed prior to the detent upshift (block 284).

Once the adaptive entry conditions have been met, the block 286 is executed to determine the delay time error term DELERR according to the expression:

$$DELERR = (SHFTRPM - DESRPM)/SHFTACC.$$

If DELERR is within a window or deadband DB of expected variability, as determined at block 288, the routine is exited. Otherwise, the block 290 is executed to update the adaptive delay time correction table in accordance with (DELERR/4). This is accomplished as indicated at block 290 by identifying the appropriate adaptive data point based on transmission temperature Tt and shift type, and adjusting it by (DELERR/4). Adjacent data points may be adjusted by a suitably diminished amount, if desired. The block 290 also serves to bound the magnitude of the adjusted data point in accordance with a predefined maximum, MAX.

In the manner described above, the control of this invention provides a method of scheduling detent upshifting which maximizes the powertrain performance while reliably preventing the engine from exceeding a desired speed limit. While the invention has been described in reference to the illustrated embodiment, it is expected that various modifications will occur to those skilled in the art. In this regard, it should be realized that controls incorporating such modifications may fall within the scope of this invention, which is defined by the appended claims.

The embodiments of the invention in which an exclusive property or privilege is claimed are defined as follows:

1. In a motor vehicle powertrain having an engine connected to drive a vehicle through an automatic shift transmission, the powertrain operating in a detent mode when an engine load indicator exceeds a predefined threshold, a method of operation for initiating upshifting of said transmission during said detent mode, comprising the steps of:
   measuring an acceleration of said engine;
   retrieving a delay time from a table of empirically determined time intervals corresponding to a period between initiation of an upshift and achievement of a peak engine speed during such upshift;
   determining an engine speed change which is expected to occur in the course of said retrieved delay time based on said measured acceleration;
   developing a trigger speed reference in relation to a difference between said determined engine speed change and a limit speed of said engine; and
   initiating an upshift of said transmission when said engine achieves a speed at least as great as said trigger speed reference, whereby the peak engine speed achieved during said upshift substantially coincides with said limit speed of said engine.

2. The method of operation set forth in claim 1, wherein said delay time is retrieved from said table of empirically determined time intervals as a function of transmission temperature.

3. The method of operation set forth in claim 1, including the steps of:
   identifying a peak engine speed actually occurring in the course of said initiated upshift;
   determining a delay time error based on an engine acceleration measured at the initiation of said upshift and a deviation between said identified speed and the limit speed of said engine;

storing a delay time correction amount in relation to the determined delay time error; and in subsequent upshifting of said transmission, adjusting said retrieved delay time in relation to said stored correction amount.

4. The method of operation set forth in claim 3, wherein said correction amount is stored as a function of transmission temperature during said upshift.

5. In a motor vehicle powertrain having an engine connected to drive a vehicle through an automatic shift transmission, the powertrain operating in a detent mode when an engine load indicator exceeds a predefined threshold, control apparatus for initiating upshifting of said transmission during said detent mode, comprising:

means for measuring an acceleration of said engine prior to upshift initiation;

base look-up means for storing an empirically determined set of delay times corresponding to a time interval between initiation of an upshift and achievement of peak engine speed during such upshift;

means for determining an engine speed change which is expected to occur in the course of said time interval based on said measured acceleration and a base delay time obtained from said base look-up means;

means for developing a trigger speed reference in relation to a difference between the determined engine speed change and a limit speed of said engine; and means for initiating an upshift of said transmission when said engine achieves a speed at least as great as said trigger speed reference, whereby the peak engine speed achieved during such upshift substantially coincides with said limit speed of said engine.

6. The control apparatus set forth in claim 5, wherein said empirically determined delay times are stored in said base look-up means as a function of transmission temperature.

7. The control apparatus set forth in claim 5, including:

means for identifying a peak engine speed actually occurring in the course of said initiated upshift;

means for determining a delay time error based on an engine acceleration measured at the initiation of said upshift and a deviation between said identified speed and the limit speed of said engine;

adaptive look-up means means for storing a delay time correction amount in relation to the determined delay time error; and in subsequent upshifting of said transmission, means for adjusting said retrieved delay time in relation to said stored correction amount.

8. The control apparatus set forth in claim 7, wherein said correction amounts are stored in said adaptive look-up means as a function of transmission temperature during said upshift.

9. The control apparatus set forth in claim 8, wherein said base delay time and said correction amounts are obtained from said base and adaptive look-up means as a function of a transmission temperature determined during said detent mode.

* * * * *